United States Patent
Defoy et al.

(10) Patent No.: US 12,323,026 B2
(45) Date of Patent: Jun. 3, 2025

(54) SYSTEM COMPRISING A COOLING DEVICE FOR A MACHINE ENCLOSED IN A PRESSURIZED CASING

(71) Applicant: THERMODYN SAS, Le Creusot (FR)

(72) Inventors: Benjamin Defoy, Le Creusot (FR); Rémi Falcand, Le Creusot (FR); Christophe Puaut, Le Creusot (FR)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 303 days.

(21) Appl. No.: 18/040,949

(22) PCT Filed: Aug. 5, 2021

(86) PCT No.: PCT/EP2021/025303
§ 371 (c)(1),
(2) Date: Feb. 7, 2023

(87) PCT Pub. No.: WO2022/033721
PCT Pub. Date: Feb. 17, 2022

(65) Prior Publication Data
US 2023/0318393 A1 Oct. 5, 2023

(30) Foreign Application Priority Data
Aug. 12, 2020 (FR) ..................... 2008465

(51) Int. Cl.
*H02K 5/20* (2006.01)
*H02K 9/19* (2006.01)
(Continued)

(52) U.S. Cl.
CPC ............... *H02K 5/203* (2021.01); *H02K 5/20* (2013.01); *H02K 9/19* (2013.01); *H02K 9/193* (2013.01); *F04B 39/064* (2013.01); *F04B 39/121* (2013.01)

(58) Field of Classification Search
CPC ........ F25B 31/008; F25B 31/02; F04B 53/16; F04B 39/064; F04B 39/121; F04B 53/08;
(Continued)

(56) References Cited

U.S. PATENT DOCUMENTS 3,060,335 A * 10/1962 Greenwald ............ H02K 5/203
310/58
4,968,009 A * 11/1990 Asari ........................ F27D 9/00
266/259

FOREIGN PATENT DOCUMENTS

CN 105162286 A 12/2015
DE 102017103270 A1 8/2017
(Continued)

*Primary Examiner* — Alexander A Singh
(74) *Attorney, Agent, or Firm* — Paul Frank + Collins P.C.

(57) ABSTRACT

System comprising: a pressurized casing delimiting an enclosure for at least one machine; a cooling device including: a cooling jacket located inside the pressurized casing; at least one removable sealing element between the cooling jacket and one of a cooling medium inlet or outlet pipe located outside the pressurized casing, wherein the removable sealing element comprises inner and outer cylindrical pieces extending coaxially through the casing and a flange attached to the casing for maintaining the cylindrical pieces, the inner cylindrical piece allowing the cooling medium circulation between the cooling jacket and one of the cooling medium inlet or outlet pipe, the removable sealing element comprising a cooling medium sealing barrier including a sealing located between the inner cylindrical piece and the cooling jacket, and a gas sealing barrier including a sealing located between the outer cylindrical piece and the cooling jacket.

12 Claims, 5 Drawing Sheets

(51) Int. Cl.
*H02K 9/193* (2006.01)
*F04B 39/06* (2006.01)
*F04B 39/12* (2006.01)

(58) Field of Classification Search
CPC ............ H02K 5/203; H02K 5/20; H02K 9/00;
H02K 9/02; H02K 9/04; H02K 9/06;
H02K 9/08; H02K 9/10; H02K 9/12;
H02K 9/14; H02K 9/16; H02K 9/18;
H02K 9/19; H02K 9/193; F01P 3/02
USPC .................... 310/52, 54, 55, 57, 58, 60 A
See application file for complete search history.

(56) References Cited

FOREIGN PATENT DOCUMENTS

| | | |
|---|---|---|
| GB | 434306 A | 8/1935 |
| GB | 704124 A | 2/1954 |
| KR | 20190113295 A | 10/2019 |

\* cited by examiner

SYSTEM COMPRISING A COOLING DEVICE FOR A MACHINE ENCLOSED IN A PRESSURIZED CASING

FIELD OF THE INVENTION

Embodiments of the invention relate generally to a machine enclosed in a pressurized casing.

In particular, embodiments of the invention relate to a cooling device for a machine enclosed in a pressurized casing, and more particularly to removable sealing elements of a cooling device for circulation of a coolant medium through the pressurized casing.

Notably, integrated motor-compressor units are known, wherein both the electric motor and the compressor are hermetically enclosed in a cylindrical casing.

Integration of a cooling device in such a configuration requires safety precautions related to differential pressure between the cooling medium, water for example, and the pressurized gas inside the casing. Notably, the pressurized gas tends to move towards the lower-pressure cooling medium, the mixture exposing the cooling system to a potential risk of over-pressure.

DESCRIPTION OF RELATED ART

A usual integration consists in welding the cooling device to the inside of the pressurized casing.

Nevertheless, manufacturing is complicated and, considering the location of the welds, it raises issues of accessibility. Besides, welding is difficult on cast iron casing.

According to another commonly used solution, O-rings are positioned between a cooling jacket and the casing. Although it is simple, this approach requires a frequent and complicated maintenance for replacing the joints which involves entirely disassembling the system. Moreover, a potential damage of the O'ring during the assembly would be identified only after full assembly which involves again entirely disassembling the system.

There is a need to avoid at least some of the previously mentioned drawbacks, especially by preventing a mixture between the coolant medium circuit and the pressurized gas inside the casing.

SUMMARY

According to one aspect, a system comprising a pressurized casing delimiting an enclosure for at least one machine and a cooling device is proposed.

The cooling device includes:

a cooling jacket located inside the pressurized casing;

at least one removable sealing element between the cooling jacket and one of a cooling medium inlet or outlet pipe located outside the pressurized casing, wherein the removable sealing element comprises inner and outer cylindrical pieces extending coaxially through the casing and a flange attached to the casing for maintaining the cylindrical pieces, the inner cylindrical piece allowing the cooling medium circulation between the cooling jacket and one of the cooling medium inlet or outlet pipe, the removable sealing element comprising a cooling medium sealing barrier including a sealing device located between the inner cylindrical piece and the cooling jacket, and a gas sealing barrier including a sealing device located between the outer cylindrical piece and the cooling jacket.

Preferably, the inner and outer cylindrical pieces are kept apart from each other so as to form a gap connected to a vent leading to the outside of the pressurized casing.

Advantageously, the removable sealing element may comprise an adaptation piece, located between the casing and the flange, and maintaining the inner and outer cylindrical pieces.

Advantageously, the vent may be located in the adaptation piece.

Preferably, the gas sealing barrier further includes a sealing device located between the outer cylindrical piece and the casing.

Preferably, the gas sealing barrier further includes a sealing device located between the inner cylindrical piece and the adaptation piece, or located between the inner cylindrical piece and the flange if the removable sealing element does not include an adaptation piece. Or located between the inner cylindrical piece and the casing.

Advantageously, the cooling device comprises:

a first removable sealing element for the cooling medium circulation between the cooling jacket and a cooling medium inlet pipe located outside the pressurized casing, and a second removable sealing element for the cooling medium circulation between the cooling jacket and a cooling medium outlet pipe located outside the pressurized casing.

According to one embodiment, the cooling jacket and the inner cylindrical piece are attached by complementary screw-threads so as to form a cooling medium sealing barrier between the inner cylindrical piece and the cooling jacket.

Advantageously, the cooling jacket may comprise two independent upper and lower parts, enclosing a cooling circuit and welded one another to their extremities.

According to an alternative embodiment, the cooling jacket can be made by additive manufacturing.

According to another alternative embodiment, the cooling jacket can be made by casting process.

Besides, the pressurized casing may enclose at least one of the following machines: a turbine, an electric generator, a compressor and an electric driver.

BRIEF DESCRIPTION OF THE DRAWINGS

Other advantages and features of the invention will appear on examination of the detailed description of embodiments, in no way restrictive, and the appended drawings in which.

DETAILED DESCRIPTION

Embodiments herein discloses arrangements of a compressor cooling system comprising at least one removable sealing element for cooling medium circulation in a cooling device extending between the interior and the exterior of a pressurized casing.

The removable sealing element comprises at least one cooling medium sealing barrier and one gas sealing barrier preventing the mixture between the cooling medium flowing in the cooling circuit and the gas contained on the pressurized casing.

Figure 1:
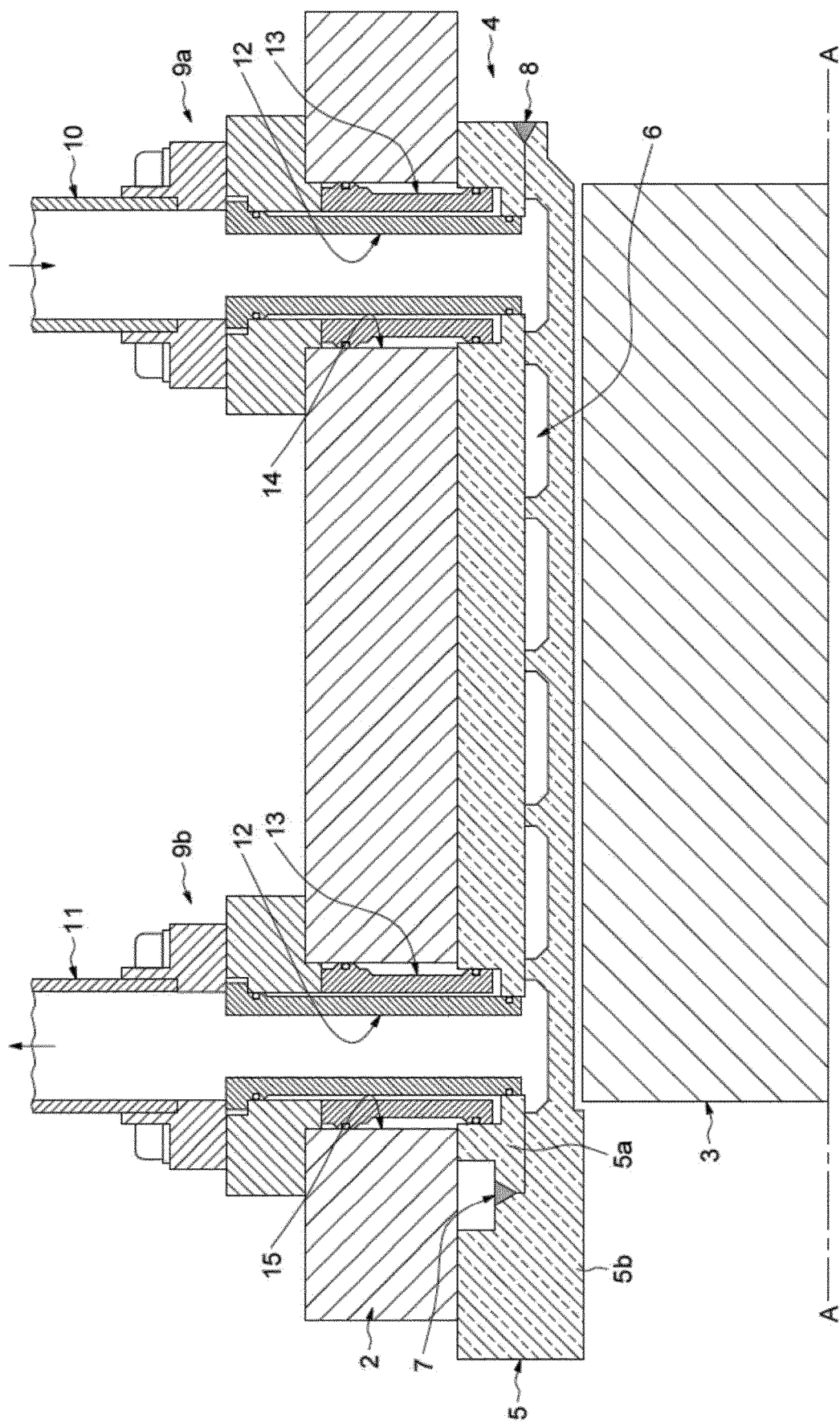
FIG. 1 represents an embodiment of a system comprising a cooling device for a machine enclosed in a pressurized casing according to the invention.

Reference is made to FIG. 1 which represents an embodiment of a system 1 comprising a pressurized casing 2 delimiting an enclosure for at least one machine 3 and a cooling device 4.

In the illustrated example, the machine 3 is a motor compressor unit. However, the pressurized casing encloses at least one of the following machines: a turbine, an electric generator, a compressor and an electric driver The pressurized casing 2 extends about a central axis A which is coincident with an axis of rotation of the motor compressor unit.

The cooling device 4 includes a cooling jacket 5 located inside the pressurized casing 2, preferably against the inner surface of the pressurized casing 2.

As an example, the illustrated cooling jacket 5 comprises two independent upper and lower parts, respectively 5a and 5b, enclosing a cooling circuit 6. The upper and lower parts 5a and 5b are welded one another to their extremities by welds 7 and 8.

According to alternative embodiments, the cooling jacket 5 can be made by additive manufacturing or can be made by casting process.

The cooling circuit 6 may extend as a coil within the cooling jacket 5.

Besides, in the illustrated example, the cooling medium is water.

The cooling device 4 further comprises at least one removable sealing element between the cooling jacket 5 and one of a cooling medium inlet or outlet pipe located outside the pressurized casing 2.

Preferably, the cooling device 4 includes two removable sealing elements, a first removable sealing element 9a for the cooling medium circulation between the cooling jacket 5 and a cooling medium inlet pipe 10 and a second removable sealing element 9b for the cooling medium circulation between the cooling jacket 5 and a cooling medium outlet pipe 11.

The cooling medium coming from the cooling medium inlet 10 may thus penetrate the pressurized casing 2 passing through the first removable sealing element 9a, may circulate inside the cooling jacket 5 and then get out the pressurized casing 2 passing through the second removable sealing element 9b towards the cooling medium outlet 11.

Each removable sealing element comprises inner and outer cylindrical pieces, respectively 12 and 13, extending coaxially through the pressurized casing 2, in an opening provided for this purpose, respectively 14 and 15 for the removable sealing elements 9a and 9b.

In another embodiment, inner and outer cylindrical pieces 12 and 13 can also be merged in a single element. In this case, a vent hole between the seals is drilled.

The inner cylindrical piece 12 allows the cooling medium circulation between the cooling jacket 5 and one of the cooling medium inlet or outlet pipe 10, 11.

Figure 2:
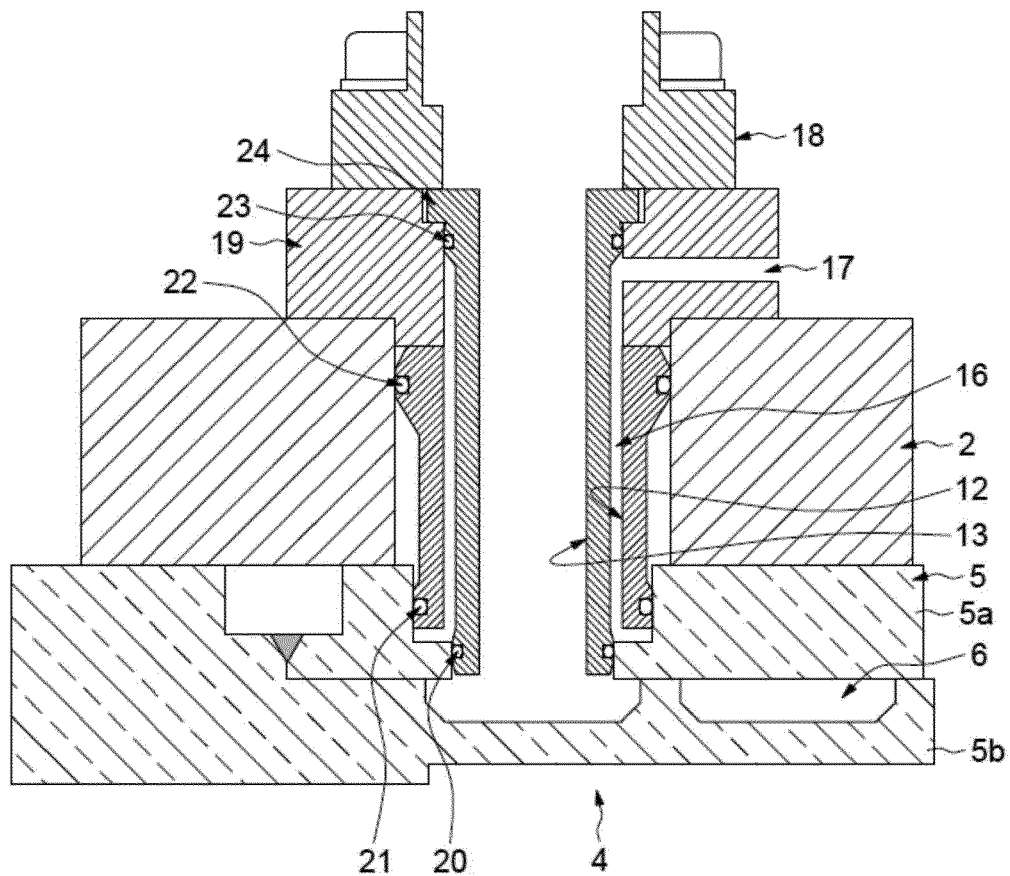
FIG. 2 is a detailed view of a removable sealing element according to an embodiment of the invention, comprising an adaptation piece.

Advantageously, for safety precaution, the inner and outer cylindrical pieces 12, 13 are kept apart from each other so as to form a gap 16 connected to a vent 17, visible in FIG. 2, leading to the outside of the pressurized casing 2. In case of leaks through this vent 17, one may quickly identify if a sealing element does not operate properly.

A flange 18 is attached to the pressurized casing 2 for maintaining the cylindrical pieces 12 and 13. For example, the flange 18 may be attached by screws. An opening is provided through the flange 18 for the circulation of the cooling medium between the removable sealing element 9a, 9b and the cooling medium inlet or outlet pipe 10, 11.

The embodiment of removable sealing element illustrated in FIGS. 1 and 2 comprises an adaptation piece 19. The adaptation piece 19 is an intermediate piece located between the pressurized casing 2 and the flange 18, and maintaining the inner and outer cylindrical pieces 12, 13 in position within the pressurized casing 2. As an example, the flange 18 may be attached to the pressurized casing 2 by screws passing through the adaptation piece 19.

As illustrated, the vent 17 may be located in the adaptation piece 19.

Figure 3:
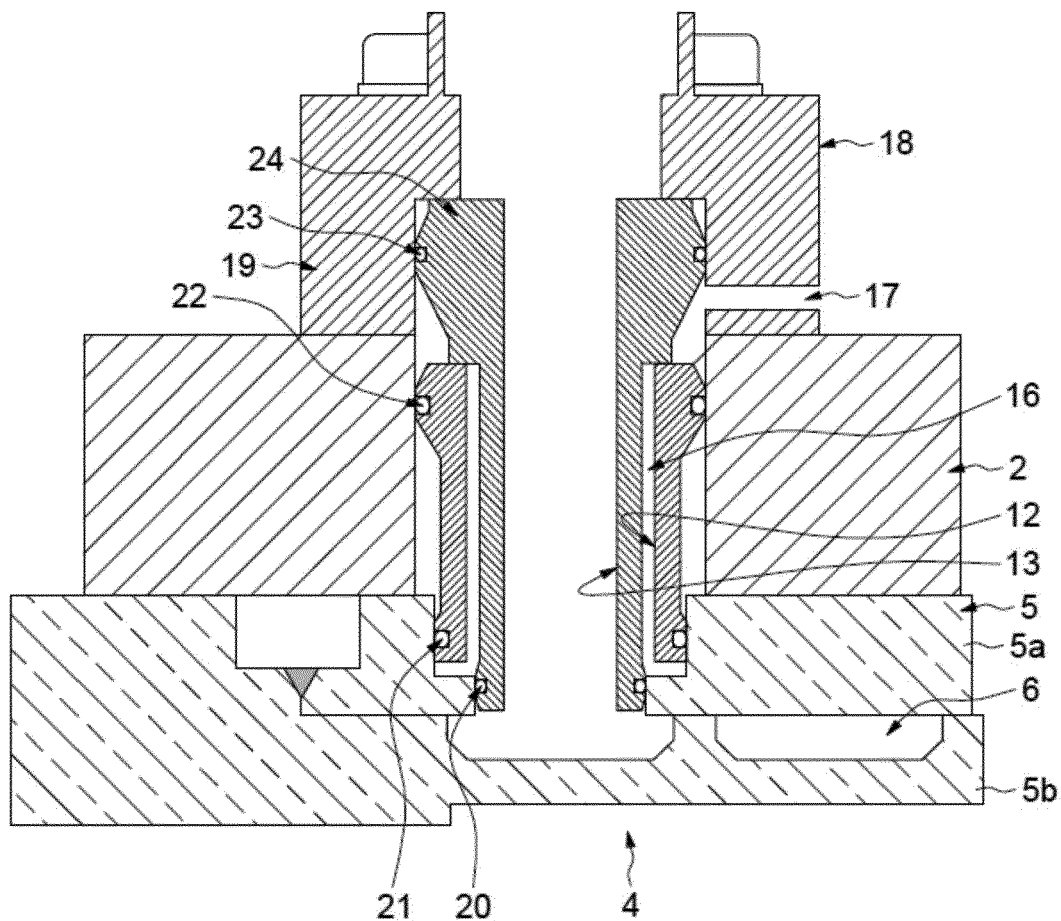
FIG. 3 is a detailed view of a removable sealing element according to another embodiment of the invention.

According to an alternative embodiment shown in FIG. 3, the flange 18 may be configured to replace the adaptation piece 19. In this case, the flange 18 may comprise the vent 17. As shown in FIG. 3, the upper part diameter of the inner cylindrical piece 12 can be advantageously adapted to cooperate with the flange 18.

Besides, each removable sealing element 9a, 9b comprises a cooling medium sealing barrier including a sealing device 20 located between the inner cylindrical piece 12 and the cooling jacket 5, preventing the leaking of the cooling medium from the cooling circuit 6 to the outside of the inner cylindrical piece 12.

Each removable sealing element 9a, 9b further comprises a gas sealing barrier including a sealing device 21 located between the outer cylindrical piece 13 and the cooling jacket 5, preventing the leaking of the gas from the pressurized casing 2 to the inside of the outer cylindrical piece 13.

In the examples illustrated in the figures, the sealing devices of the cooling medium sealing barrier and the gas sealing barrier include a gasket, preferably O-ring.

This forms a double sealing barrier preventing both cooling medium and gas to mix.

The gas sealing barrier further includes a sealing device 22, preferably located between the outer cylindrical piece 13 and the pressurized casing 2.

The cooling medium sealing barrier of each removable sealing element 9a, 9b of the illustrated embodiment also includes a sealing device 23 located between the inner cylindrical piece 12 and the adaptation piece 19 as illustrated in FIG. 2. The sealing device 23 can also be located between the inner cylindrical piece 12 and the flange 18 as illustrated in FIG. 3, or located between the inner cylindrical piece 12 and the casing 2 (not illustrated here), if the removable sealing element 9a, 9b does not include an adaptation piece 19.

Each of the sealing devices 20 and 23 of the cooling medium sealing barrier is located at one end of the inner cylindrical piece 12, and each of the sealing devices 21 and 22 of the gas sealing barrier is located at one end of the outer cylindrical piece 13.

The inner cylindrical piece 12 may include an upper rim 24 cooperating with the adaptation piece 19 or the flange 18 if no adaptation piece 19 is provided, in order to be well positioned and well aligned within the opening 14, 15 of the casing 2.

Figure 4:
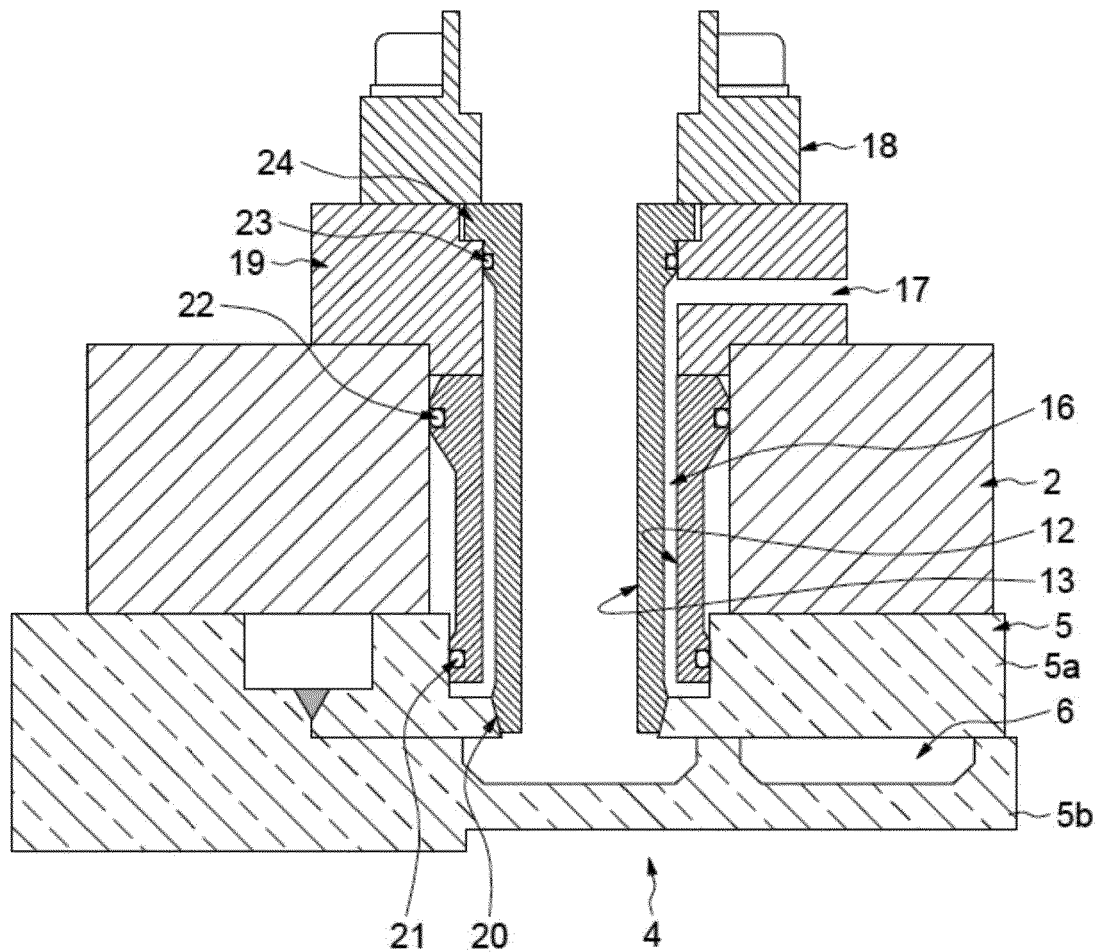
FIG. 4 is a detailed view of a removable sealing element according to another embodiment of the invention, including a screw-thread sealing.

Referring now to FIG. 4 which depicts another embodiment of the cooling medium sealing barrier, the cooling jacket 5 and the inner cylindrical piece 12 are attached by complementary screw-threads so as to form the sealing device 20 of the cooling medium sealing barrier between the inner cylindrical piece 12 and the cooling jacket 5. The sealing device may be for example a gas thread or NPT thread ("National Pipe Thread", NPT).

Figure 5:
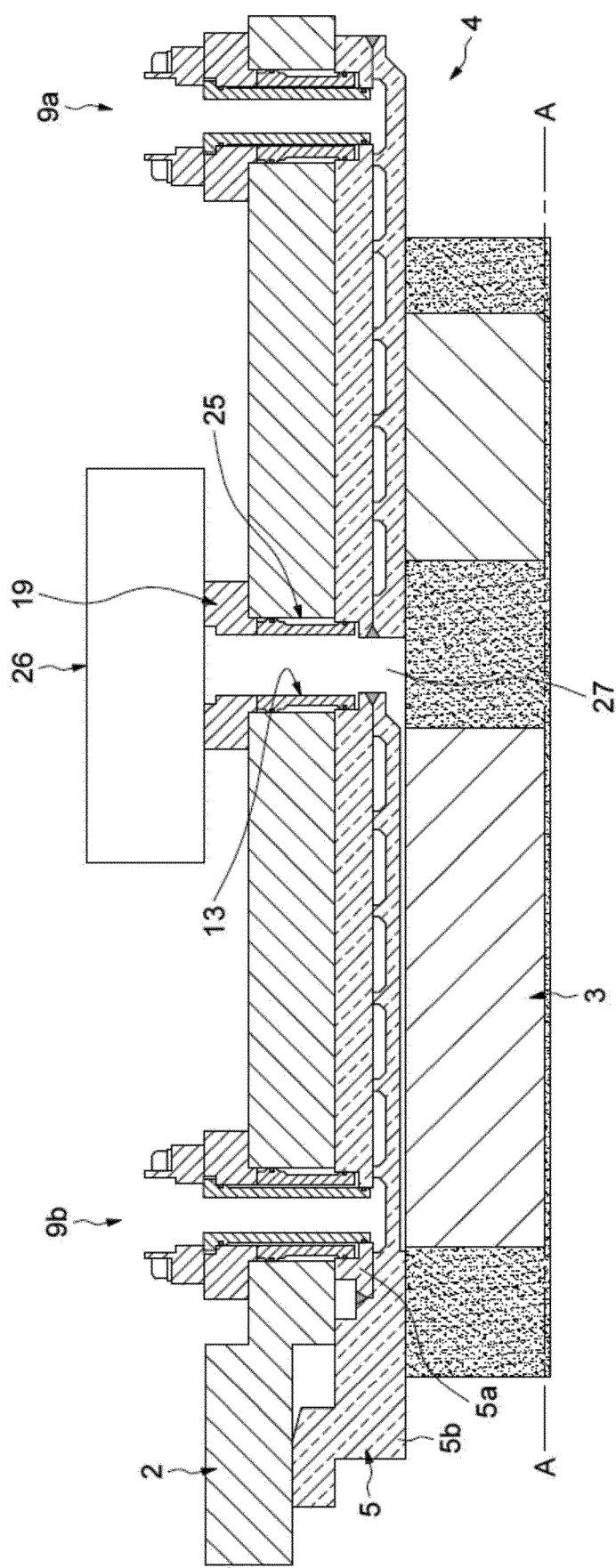
FIG. 5 represents another embodiment of a system comprising a cooling device for a machine enclosed in a pressurized casing according to the invention, comprising a passage for power supply cables.

Furthermore, the pressurized casing 2 of the system 1 may also be provided with an opening 25 for the passage of power supply cables from the machine 3 to a terminal box 26, visible in FIG. 5.

In this embodiment, the cooling jacket 5 is advantageously provided with a passage 27.

In order to protect the power supply cables against the gas, an outer cylindrical piece 13 and, for example, an adaptation piece 19, may be inserted within the opening 25 of the pressurized casing 2.

Referring now to FIGS. 1, 2, 3, 4 and 5, one operating cycle of the system 1 will now be described. In operation, cooling medium from cooling medium inlet pipe 10 can penetrate the interior of the pressurized casing 2 through the inner cylindrical piece 12 of the first removable sealing element 9a and circulates through the cooling circuit 6 of the cooling jacket 5 for cooling of the motor compressor unit 3.

The first removable sealing element comprises a cooling medium sealing barrier including a sealing device 20 located between the inner cylindrical piece 12 and the cooling jacket 5. Besides, a gas sealing barrier including a sealing device 21 is located between the outer cylindrical piece 13, which extends coaxially of the inner cylindrical piece 12, and the cooling jacket 5.

The cooling medium sealing barrier and the gas sealing barrier of the system prevent the risk of over-pressure by preventing the mixture between gas and cooling medium.

In a similar way, cooling medium can then flow back to the exterior of the pressurized casing 2, circulating through the second removable sealing element 9b, towards the cooling medium outlet pipe 11.

The configuration of the removable sealing elements 9a, 9b an enable a fast and easy maintenance.

The invention claimed is:

1. A system comprising:
   a pressurized casing delimiting an enclosure for at least one machine;
   a cooling device including: a cooling jacket located inside the pressurized casing;
   at least one removable sealing element between the cooling jacket and one of a cooling medium inlet or outlet pipe located outside the pressurized casing,
   wherein the removable sealing element comprises inner and outer cylindrical pieces extending coaxially through the casing and a flange attached to the casing for maintaining the cylindrical pieces, the inner cylindrical piece allowing the cooling medium circulation between the cooling jacket and one of the cooling medium inlet or outlet pipe, the removable sealing element comprising a cooling medium sealing barrier including a sealing device located between the inner cylindrical piece and the cooling jacket, and a gas sealing barrier including a sealing device located between the outer cylindrical piece and the cooling jacket.

2. The system of claim 1, wherein the inner and outer cylindrical pieces are kept apart from each other so as to form a gap connected to a vent leading to the outside of the pressurized casing.

3. The system of claim 2, wherein the vent is located in the adaptation piece.

4. The system of claim 1, wherein the removable sealing element comprises an adaptation piece, located between the casing and the flange, and maintaining the inner and outer cylindrical pieces.

5. The system of claim 1, wherein the gas sealing barrier further includes a sealing device located between the outer cylindrical piece and the casing.

6. The system of claim 1, wherein the gas sealing barrier further includes a sealing device located between the inner cylindrical piece and the adaptation piece, or located between the inner cylindrical piece and the casing, or located between the inner cylindrical piece and the flange if the removable sealing element does not include an adaptation piece.

7. The system of claim 1, wherein the cooling device comprises: a first removable sealing element for the cooling medium circulation between the cooling jacket and a cooling medium inlet pipe located outside the pressurized casing, and a second removable sealing element for the cooling medium circulation between the cooling jacket and a cooling medium outlet pipe located outside the pressurized casing.

8. The system of claim 1, wherein the cooling jacket and the inner cylindrical piece are attached by complementary screw-threads so as to form a cooling medium sealing barrier between the inner cylindrical piece and the cooling jacket.

9. The system of claim 1, wherein the cooling jacket comprises two independent upper and lower parts, enclosing a cooling circuit and welded one another to their extremities.

10. The system of claim 1, wherein the cooling jacket is made by additive manufacturing, enclosing a cooling circuit.

11. The system of claim 1, wherein the cooling jacket is made by casting process, enclosing a cooling circuit.

12. The system of claim 1, wherein the pressurized casing encloses at least one of the following machines: a turbine, an electric generator, a compressor and an electric driver.

* * * * *